United States Patent
Ottow (10) Patent No.: US 10,344,869 B2
(45) Date of Patent: Jul. 9, 2019

(54) LABYRINTH SEAL WITH LUBRICANT DIRECTING PROJECTION

(71) Applicant: Rolls-Royce Corporation, Indianapolis, IN (US)

(72) Inventor: Nathan W. Ottow, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 0 days.

(21) Appl. No.: 15/168,813

(22) Filed: May 31, 2016

(65) Prior Publication Data

US 2017/0343111 A1    Nov. 30, 2017

(51) Int. Cl.

| F16J 15/447 | (2006.01) |
|---|---|
| F16C 3/02 | (2006.01) |
| F01D 11/02 | (2006.01) |
| F01D 25/18 | (2006.01) |
| F16C 33/66 | (2006.01) |
| F16C 33/80 | (2006.01) |

(Continued)

(52) U.S. Cl.
CPC ......... *F16J 15/4472* (2013.01); *F01D 11/025* (2013.01); *F01D 25/183* (2013.01); *F16C 3/02* (2013.01); *F16C 33/6685* (2013.01); *F16C 33/80* (2013.01); *F16J 15/164* (2013.01); *F16J 15/445* (2013.01); *F05D 2250/314* (2013.01); *F05D 2250/324* (2013.01); *F05D 2250/712* (2013.01); *F16C 19/06* (2013.01)

(58) Field of Classification Search
CPC ........ F16C 3/02; F16C 33/6685; F16C 33/80; F16C 19/06; F16J 15/44721; F16J 15/164; F16J 15/445; F01D 11/025; F01D 25/183; F05D 2250/314; F05D 2250/324; F05D 2250/712
USPC .......................................... 277/303, 409–421
See application file for complete search history.

(56) References Cited

U.S. PATENT DOCUMENTS

| 1,354,235 A | * | 9/1920 | Bonom | .................... F01D 11/02 277/420 |
|---|---|---|---|---|
| 2,281,905 A | * | 5/1942 | Young | .................... F16C 33/78 277/420 |

(Continued)

FOREIGN PATENT DOCUMENTS

EP    3018299 A1    5/2016

OTHER PUBLICATIONS

European Patent Office, Extended European Search Report for corresponding EP Application No. 17172925.4 dated Oct. 19, 2017, 6pgs.

(Continued)

*Primary Examiner* — Nathan Cumar
(74) *Attorney, Agent, or Firm* — Duane Morris LLP (57) ABSTRACT

A seal assembly and method of directing fluid flow away from a seal. The seal assembly comprises an inner seal member coupled to a rotatable shaft and an outer seal member which is either rotatable or static. The inner seal member has a plurality of knives spaced apart from each other and extending radially away from the shaft. The outer seal member has a rub surface disposed to abut a terminal edge of at least one of the plurality of knives to thereby form a seal. An outer knife of the plurality of knives of the inner seal member extends axially at an angle and is adapted to direct fluid flow away from the seal.

4 Claims, 6 Drawing Sheets

(51) Int. Cl.
*F16J 15/16* (2006.01)
*F16J 15/44* (2006.01)
*F16C 19/06* (2006.01)

(56) References Cited

U.S. PATENT DOCUMENTS

| | | | |
|---|---|---|---|
| 2,973,136 A * | 2/1961 | Greenwald | F01D 25/16 |
| | | | 277/348 |
| 3,133,693 A | 5/1964 | Holl | |
| 3,251,601 A * | 5/1966 | Harvey | F01D 11/08 |
| | | | 277/424 |
| 3,420,434 A * | 1/1969 | Swearingen | F01D 11/04 |
| | | | 277/412 |
| 3,527,053 A * | 9/1970 | Horn | F01D 3/04 |
| | | | 184/6.11 |
| 3,532,399 A | 10/1970 | Gray | |
| 3,989,410 A * | 11/1976 | Ferrari | F01D 3/00 |
| | | | 415/115 |
| 4,071,255 A | 1/1978 | Salter, Jr. | |
| 4,099,727 A * | 7/1978 | Weiler | F16J 15/443 |
| | | | 277/412 |
| 4,402,515 A | 9/1983 | Malott | |
| 4,770,424 A | 9/1988 | Otto | |
| 4,820,119 A | 4/1989 | Joyce | |
| 5,085,443 A | 2/1992 | Richards | |
| 5,224,713 A | 7/1993 | Pope | |
| 5,738,356 A | 4/1998 | Marshall | |
| 6,000,701 A | 12/1999 | Burgess | |
| 6,330,790 B1 * | 12/2001 | Arora | F01D 11/04 |
| | | | 277/303 |
| 7,093,418 B2 | 8/2006 | Morris et al. | |
| 7,726,021 B2 * | 6/2010 | Barnett | B23P 6/005 |
| | | | 277/412 |
| 2003/0049118 A1 | 3/2003 | Bruno et al. | |
| 2007/0193276 A1 * | 8/2007 | Corattiyil | F02C 7/06 |
| | | | 60/782 |
| 2007/0296158 A1 * | 12/2007 | Datta | F01D 11/02 |
| | | | 277/411 |
| 2008/0066444 A1 | 3/2008 | Cornelius et al. | |
| 2012/0267857 A1 | 10/2012 | Menichino | |
| 2013/0241153 A1 * | 9/2013 | Garrison | F01D 11/02 |
| | | | 277/350 |
| 2013/0283757 A1 * | 10/2013 | Bordne | F01D 25/125 |
| | | | 60/39.08 |
| 2014/0062029 A1 * | 3/2014 | Amador | F01D 11/02 |
| | | | 277/415 |
| 2016/0130966 A1 * | 5/2016 | Shorney | F16J 15/447 |
| | | | 277/412 |

OTHER PUBLICATIONS

European Patent Office, Examination Report for corresponding EP Application No. 17172925.4 dated Dec. 12, 2018, 6pgs.

* cited by examiner

LABYRINTH SEAL WITH LUBRICANT DIRECTING PROJECTION

FIELD OF THE DISCLOSURE

The present disclosure relates generally to seal assemblies, and more specifically to highly compact labyrinth-type seal assemblies for use in rotating machinery.

BACKGROUND

In a machine with rotating components it is often desirable to create seal assemblies which isolate various parts or spaces from one another. As one example, in a rotating machine having a rotatable shaft supported by a shaft bearing, it is desirable to provide lubricant to the shaft bearing without allowing the lubricant to spread to other components. An isolated chamber is formed around the shaft bearing by casing members for the purpose of retaining lubricant, and a seal assembly is used to seal between the static casing members and the rotatable shaft. The seal serves to retain lubricant and prevent contaminants from entering the chamber.

Labyrinth-type seal assemblies are used to seal between a static casing and rotatable shaft in rotating machinery. However, when lubricant pools in the vicinity of a labyrinth seal, centrifugal and windage forces can force the lubricant past the seal thus rendering the seal ineffective. Leakage of lubricant beyond the labyrinth seal can be dangerous in a rotating machine, as lubricant in contact with other machine components can cause odor, smoke, and even fire.

It is thus desired for an improvement in the art of sealing between static and rotatable components in a rotating machine which would provide for a more effective seal without incurring a weight or space penalty.

The present application discloses one or more of the features recited in the appended claims and/or the following features which, alone or in any combination, may comprise patentable subject matter.

SUMMARY

According to an aspect of the present disclosure, a seal assembly comprises an inner seal member on a rotatable shaft, the inner seal member comprising a plurality of knives spaced from each other and extending radially away from the rotatable shaft, an outer seal member comprising an axially-extending rub surface positioned such that a terminal edge of at least one of the plurality of knives of the inner seal member abuts the rub surface to form a seal, wherein an outer knife of the plurality of knives of the inner seal member extends axially at an angle adapted to direct fluid flow away from the seal.

In some embodiments the outer knife is one of an axially forward most knife or an axially aft most knife of the plurality of knives. In some embodiments the outer knife extends radially further than the other knives of the plurality of knives. In some embodiments the seal assembly is disposed between a first chamber at a first pressure and a second chamber at a second pressure. In some embodiments the first chamber is a lubricant sump having at least one lubricant collection point. In some embodiments the second pressure is higher than the first pressure, and wherein fluid from second chamber at second pressure is bled through the seal assembly into first chamber to prevent leakage of fluid from first chamber into second chamber. In some embodiments the seal assembly further comprises a bearing assembly disposed within the first chamber, the bearing assembly receiving lubricant spray from a fluid passageway defined by outer seal member. In some embodiments the outer knife is configured to prevent pooling of lubricant adjacent to the seal. In some embodiments the outer knife extends axially past a radial surface of the outer seal member.

In some embodiments the outer knife extends axially at an angle adapted to direct fluid flow away from the seal and toward a collection point. In some embodiments the outer seal member has an angled axial surface adapted to receive fluid flow from the outer knife and further direct the fluid flow away from the seal. In some embodiments the outer knife has a cavity facing surface, said surface angled between approximately 15 and 45 degrees from vertical in the axial direction. In some embodiments the outer knife has a cavity facing surface, said surface approximately vertical and axially off set from the outer seal member. In some embodiments the inner seal member is milled from the shaft. In some embodiments the inner seal member is operable for speeds between 300 ft/sec-4600 ft/sec.

According to another aspect of the present disclosure, a shaft assembly comprises a high speed shaft; a casing; a shaft bearing connecting the high speed shaft to the casing; a first seal axially displaced from the shaft bearing; a first chamber bounded in part by the first seal and the shaft bearing; the first seal comprises: a first knife having a first surface facing the shaft bearing and a second knife adjacent the first knife and axially disposed opposite the first surface; a rub strip disposed on an inner radial surface of the casing; wherein the first surface is oriented 0 to 45 degrees from the radial direction towards the shaft bearing and the second knife having a radial end in contact with the rub strip.

In some embodiments the first surface is angled between approximately 15 and 45 degrees relative to a radial direction which is perpendicular to the axis of rotation. In some embodiments the first surface is approximately vertical and axially off set from the rub strip towards the shaft bearing. In some embodiments the first and second knives are milled from the shaft. In some embodiments the shaft assembly further comprises a second seal assembly disposed on an opposite side of the shaft bearing from the first seal assembly; and an oil slinger disposed on the shaft axially between the second seal assembly and the shaft bearing, the oil slinger extending radially from the shaft into a second chamber bounded in part by the second seal and the shaft bearing.

BRIEF DESCRIPTION OF THE DRAWINGS

The following will be apparent from elements of the figures, which are provided for illustrative purposes and are not necessarily to scale.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents embodiments to overcome the aforementioned deficiencies in seal assemblies for rotating machinery. More specifically, the present disclosure is directed to a labyrinth-type seal assembly which prevents pooling of fluid adjacent the seal assembly and therefore improves seal assembly performance by reducing or eliminating fluid leakage past the seal assembly. The disclosed seal assembly does not incur a weight penalty or space penalty on the rotating machine, which can be a significant advantage for some applications such as aviation engines where space and weight are at a premium.

Figure 1:
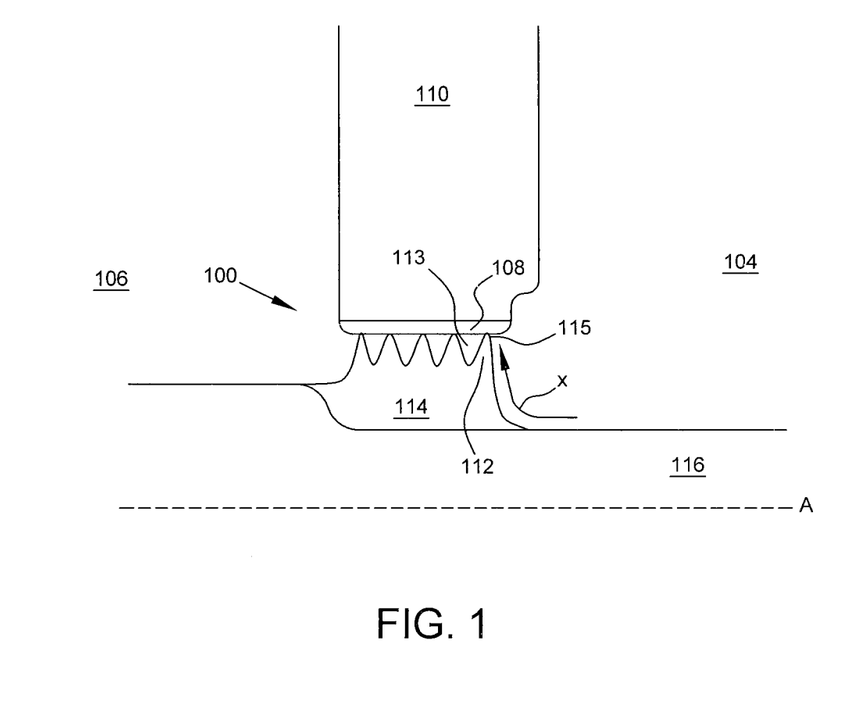
FIG. 1 is a schematic and sectional view of a labyrinth-type seal assembly in a rotating machine.

FIG. 1 is a schematic and sectional view of a labyrinth-type seal assembly 100 in a rotating machine. The seal assembly 100 seals a first chamber 104 from a second chamber 106. Seal assembly 100 comprises a rub strip 108 and inner seal member 114 having a plurality of knives 112. Rub strip 108 is coupled to an outer seal member 110 which may be rotatable or static. Inner seal member 114 is coupled to rotatable shaft 116 which is rotatable about an axis A.

The knives 112 of inner seal member 114 extend radially outward such that the terminal edge 115 of each knife 112 is in close radial proximity to or abuts the rub strip 108, creating a plurality of cavities 113 between adjacent knives 112. The plurality of terminal edges 115 abutting rub strip 108 and plurality of cavities 113 creates a torturous path between first chamber 104 and second chamber 106, thus discouraging or preventing fluid migration from one chamber to the other.

As shown in FIG. 1, when rotatable shaft 116 is rotating any fluid in first chamber 104 is subject to both centrifugal and windage forces, which can tend to move the fluid radially outward and against rub strip 108. This movement is illustrated by arrow X. Under centrifugal and windage forces, the fluid can migrate through seal assembly 100. In particular, small pockets may be formed in the radially-inner facing surface of rub strip 108 either by design (i.e. a honeycomb surface) or due to rubbing of the knives 112 against the rub strip 108. With fluid pooled against the knives 112 and rub strip 108, the fluid is more likely to migrate through the small pockets and thus through the seal assembly 100.

This migration, or leakage, of fluid from first chamber 104 to second chamber 106 is problematic. As discussed above, where fluid in first chamber 104 is lubricant, the leakage of lubricant beyond the seal assembly 100 can be dangerous in a rotating machine, as lubricant in contact with other machine components can cause odor, smoke, and even fire.

In certain applications, the problematic migration of fluid from first chamber 104 to second chamber 106 is prevented by replacing the labyrinth-type seal assembly 100 with a carbon seal, lip seal, O-ring, or similar sealing mechanism. It is also possible to install an oil slinger in the vicinity of the seal assembly 100 to create a windage and fluid barrier that prevents or greatly minimizes fluid movement through the seal assembly. However, each of these alternative seals and the use of an oil slinger have unique limitations regarding operating temperatures, rotational speed, size and weight requirements, material compatibility, assembly constraints, and cost. In particular, size and access constraints often prevent the installation of alternative seals or oil slingers on both sides of first chamber 104. It is therefore not possible or not practicable, in certain applications, to replace labyrinth-type seal assembly 100 with an alternative sealing arrangement.

In applications where seal assembly 100 cannot be replaced with a carbon seal, lip seal, O-ring, or similar sealing mechanism, and an oil slinger cannot be placed adjacent the seal assembly 100, then improved seal assembly 200 may be used in place of seal assembly 100.

Figure 2A:
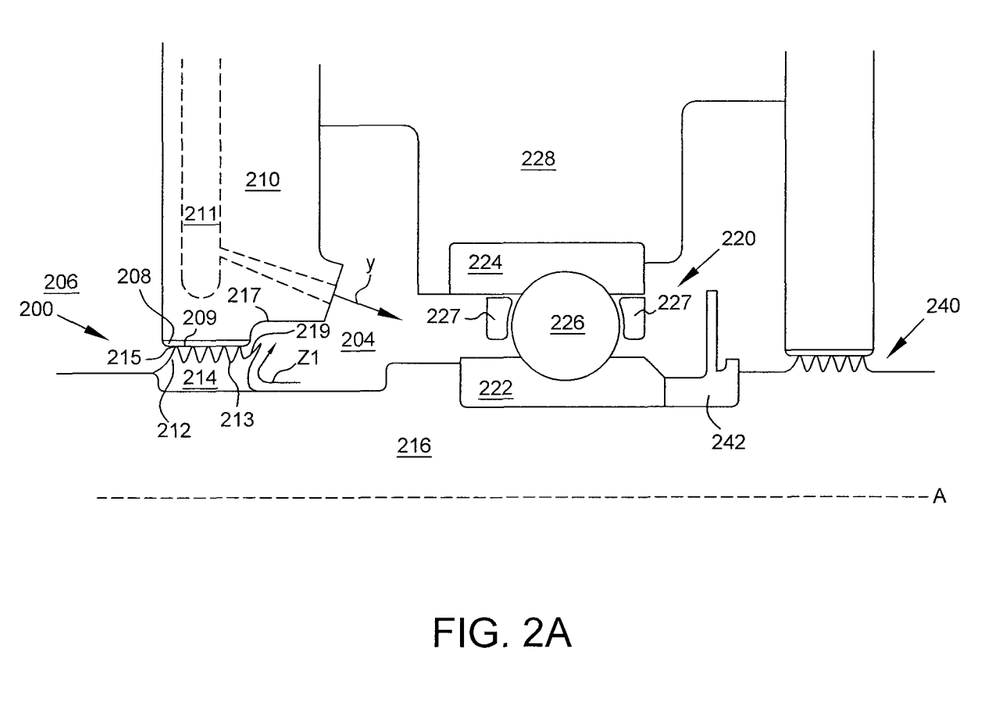
FIG. 2A is a schematic and sectional view of a labyrinth-type seal assembly in a rotating machine in accordance with some embodiments of the present disclosure.

FIG. 2A is a schematic and sectional view of a labyrinth-type seal assembly 200 in a rotating machine in accordance with some embodiments of the present disclosure. The seal assembly 200 seals a first chamber 204 from a second chamber 206. In some embodiments, first chamber 204 and/or second chamber 206 may be sealed and pressurized chambers. In some embodiments, with rotating machine in operation the first chamber 204 may be at a first pressure P1 and second chamber 206 may be at a second pressure P2. In some embodiments second pressure P2 may be higher than first pressure P1, and relatively high pressure air from second chamber 206 may bleed through seal assembly 200 into first chamber 204 to prevent fluid leakage from first chamber 204 toward second chamber 206.

In some embodiments, first chamber 204 may be a lubricant sump.

Seal assembly 200 comprises a rub strip 208 and inner seal member 214 having a plurality of knives 212. Rub strip 208 defines annular surface 209. The knives 212 are axially spaced apart from each other. The knives 212 of inner seal member 214 extend radially outward away from the rotatable shaft 216 such that a terminal edge 215 of each knife 212 is in close proximity to or abuts the rub strip 208, creating a plurality of cavities 213 between adjacent knives 212. Where a terminal edge 215 abuts the rub strip 208, a seal is formed. The plurality of terminal edges 215 abutting rub strip 208 and plurality of cavities 213 creates a torturous path between first chamber 204 and second chamber 206, thus discouraging or preventing fluid migration from one chamber to the other.

Rub strip 208 is coupled to an outer seal member 210 which may be rotatable or static. Rub strip 208 may comprise an abradable element. Rub strip 208 is an axially extending member and may be disposed to abut one or more of the plurality of terminal edges 215.

Outer seal member 210 may further comprise an axially extending surface 217 which is angled and therefore adapted to direct fluid flow away from seal assembly 200. In some embodiments lubricant is pushed along the surface 217 by an air jet created when relatively high pressure air from second chamber 206 is bled through the seal assembly 200 and into first chamber 204.

In some embodiments, outer seal member 210 may define one or more fluid passages 211 which direct the flow of a fluid such as lubricant. In some embodiments, a lubricant spray illustrated as arrow Y is released from said fluid passages 211 under pressure, with the lubricant spray Y directed toward a bearing assembly 220.

Inner seal member 214 is coupled to rotatable shaft 216 which is rotatable about an axis A. In some embodiments, inner seal member 214 may be a single annular member which is circumferentially disposed about the rotatable shaft 216. In some embodiments, inner seal member 214 may be formed integrally with rotatable shaft 216. In other embodiments inner seal member 214 may be formed separately from and coupled to rotatable shaft 216.

An outer knife 219 of the plurality of knives 212 is adapted to direct fluid flow away from seal assembly 200, or more specifically away from a seal created between at least one of the terminal edges 215 of knives 212 that abuts the rub surface 208. Arrow Z1 illustrates a fluid flow path away from the seal assembly 200 as directed by outer knife 219. Outer knife 219 thus prevents fluid from pooling adjacent to the seal, and thus minimizes or eliminates the migration of such fluid through the seal assembly 200.

In some embodiments, outer knife 219 may be either or both of the axially forward most knife 212 or the axially aft most knife 212. In some embodiments, outer knife 219 extends axially at an angle in order to direct fluid flow away from seal assembly 200. The cavity facing surface of the knife 219 in some embodiments may be angled from vertical by 15, 30, or 45 degrees. In some embodiments the angle of the cavity facing surface may be near vertical underhanging axially the rub strip 208, such that oil flung from the cavity facing surface of knife 219 impinges surface 217 rather than the rub strip 208. The cavity facing surface may be convex, concave, contoured, or flat.

In some embodiments first chamber 204 contains a machinery component such as, for example, a bearing assembly 220. In some embodiments the machinery component disposed in first chamber 204 may be a lubricated component. Bearing assembly 220 may comprise an inner race 222, outer race 224, and a bearing element 226 disposed there between. Inner race 222 may be coupled to rotatable shaft 216. Outer race 224 may be coupled to a casing member 228, which may be coupled or integrally formed to outer seal member 206. In some embodiments bearing assembly 220 further comprises one or more retaining bands 227 around the bearing element 226. In some embodiments bearing element 226 is a roller bearing element.

First chamber 204 may therefore be a lubricant sump. At least one lubricant collection point or orifice (not shown) may be included in first chamber 204. In some embodiments outer knife 219 is adapted to direct fluid flow away from seal assembly 200 and toward a lubricant collection point.

In some embodiments first chamber 204 is defined between outer seal member 210, casing member 228, inner seal member 214, and shaft 216.

In some embodiments, a second sealing assembly 240 is provided on the other side of the bearing assembly 220. In the embodiment illustrated in FIG. 2A, sealing assembly 200 is axially forward of bearing assembly 220, while sealing assembly 240 is axially aft of bearing assembly 220. Sealing assembly 240 can be of the type described above with reference to FIGS. 1A and 1B (sealing assembly 100), of the type described with reference to FIGS. 2A and 2B (sealing assembly 200), or a carbon seal, lip seal, O-ring, or similar sealing mechanism. In some embodiments, an oil slinger 242 is provided in the vicinity of sealing assembly 240.

Figure 2B:
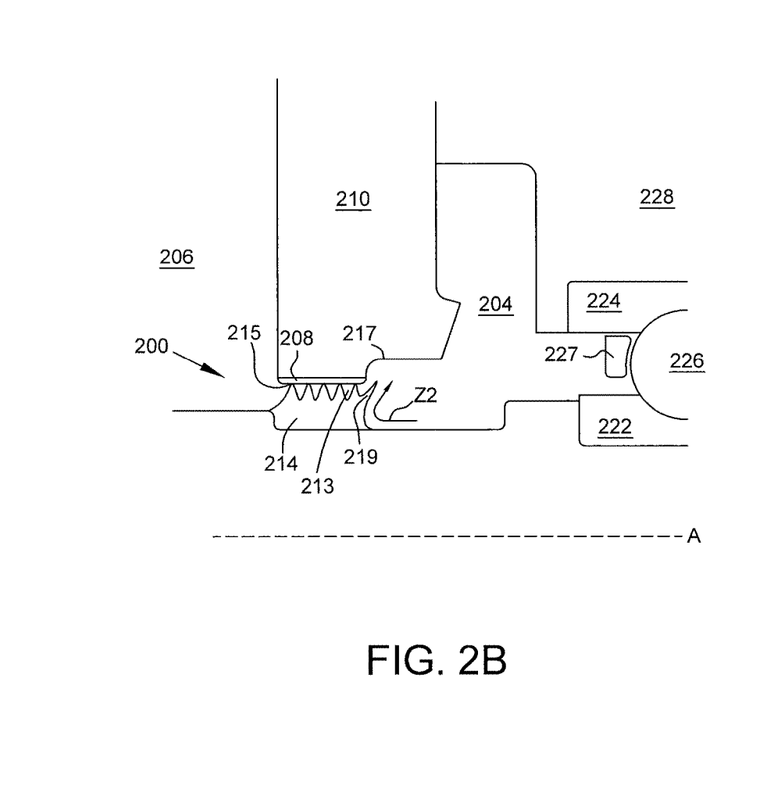
FIG. 2B is a detailed schematic and sectional view of a labyrinth-type seal assembly in a rotating machine in accordance with some embodiments of the present disclosure.

FIG. 2B is a detailed schematic and sectional view of a labyrinth-type seal assembly 200 in a rotating machine in accordance with some embodiments of the present disclosure. As illustrated in FIG. 2B, when the rotating machine is in operation by rotating the shaft 216, inner seal member 214 rotates with shaft 216 while outer seal member 210 may rotate or remain static. In some embodiments outer seal member 210 rotates in a direction counter to the direction of rotation of inner seal member 214. While inner seal member 214 rotates, at least one but preferably all terminal edges of knives 212 abut the rub surface 208 of outer seal member 210 to form at least one seal. A plurality of fluidly isolated cavities 213 are formed, each defined between a pair of adjacent knives 212 and the rub surface 208.

In some embodiments, lubricant is provided to first chamber 204 to lubricate a machinery component such as, for example, a bearing assembly 220. In some embodiments, lubricant is provided as a lubricant spray Y under pressure through a fluid passageway 211 defined by outer seal member 210. Under centrifugal and windage forces, lubricant exiting the machinery component may move axially forward or aft, and tend generally to move radially outward due to centrifugal forces.

One lubricant flow path is illustrated as arrow Z2 in FIG. 2B. Lubricant is pushed axially forward by windage forces, and then moves radially outward once inner seal member 214 prevents additional movement in the axially forward direction. Outer knife 219 extends radially outward and axially aft at an angle, such that lubricant is directed away from seal assembly 200 and more specifically away from a seal formed by the abutment of a terminal edge 215 of a knife 212 to rub surface 208. In some embodiments, lubricant flow is directed toward surface 217, which extends axially at an angle such that lubricant under the influence of centrifugal forces will move radially outward and axially aft, away from seal assembly 200.

Figure 3:
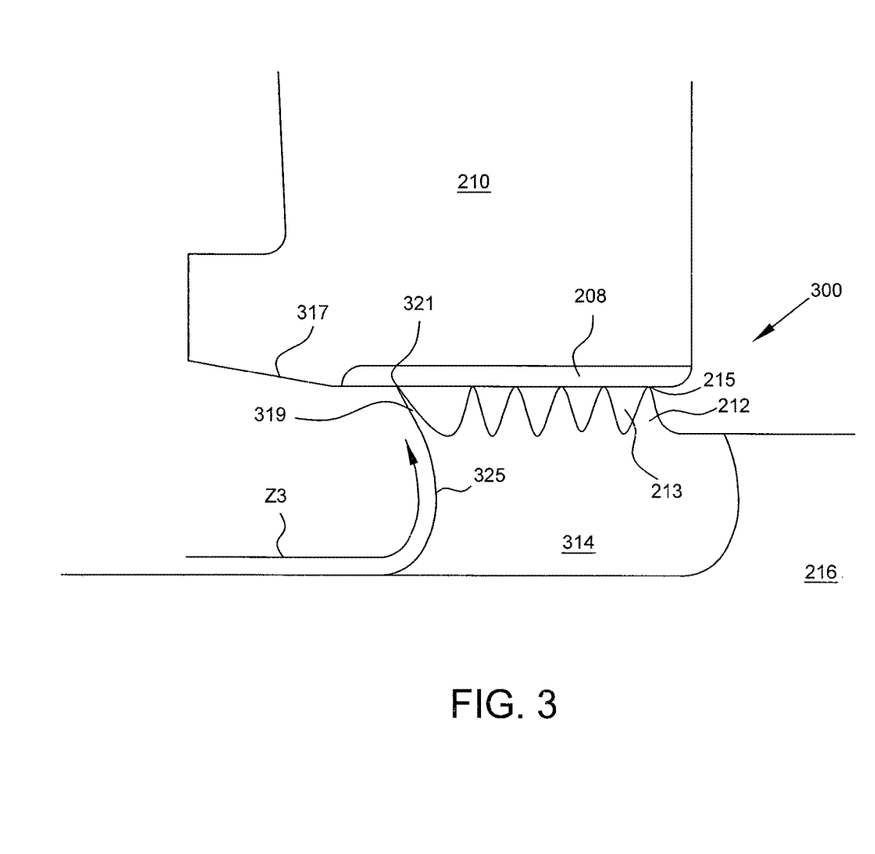
FIG. 3 a schematic and sectional view of a labyrinth-type seal assembly in a rotating machine in accordance with some embodiments of the present disclosure.

FIG. 3 a schematic and sectional view of a labyrinth-type seal assembly 300 in a rotating machine in accordance with some embodiments of the present disclosure. As illustrated in FIG. 3, in some embodiments outer knife 319 forms a continuously curved surface 325 with inner seal member 314. In some embodiments, a terminating edge 321 of outer knife 319 abuts a rub surface 208 such that a seal is formed at terminating edge 321. In some embodiments, seal assembly 300 and outer knife 319 are disposed to direct fluid flow in an axially forward direction.

Arrow Z3 illustrates fluid flow in this embodiment. Fluid is pushed in an axially aft direction by windage forces, and then moves radially outward along the continuously curved surface 325. The fluid is directed away from seal assembly 300 by outer knife 319 and then moves axially forward and radially outerward along surface 317. The terminating edge 321 of outer knife 319 forms a seal which prevents fluid flow toward the plurality of knives 212 and cavities 213.

Figure 4A:
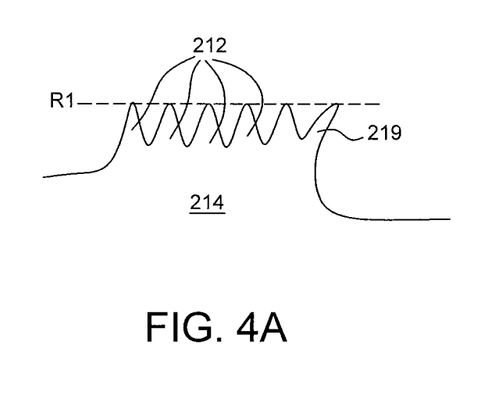
FIG. 4A a schematic and sectional view of an inner seal element in accordance with some embodiments of the present disclosure.
Figure 4B:
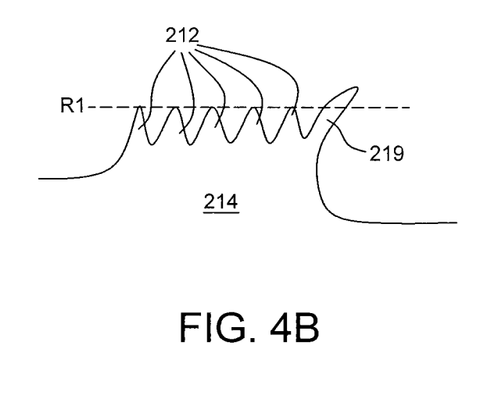
FIG. 4B a schematic and sectional view of an inner seal element in accordance with some embodiments of the present disclosure.

FIGS. 4A and 4B are schematic and sectional view of inner seal elements in accordance with some embodiments of the present disclosure. As illustrated in FIGS. 4A and 4B, in some embodiments each of the plurality of knives 212 extend radially outward to a first radial distance R1. In some embodiments, such as that illustrated in FIG. 4A, outer knife 219 extends radially outward to the first radial distance R1. However, in other embodiments, such as that illustrated in FIG. 4B, outer knife 219 extends radially outward past the first radial distance R1.

Figure 5A:
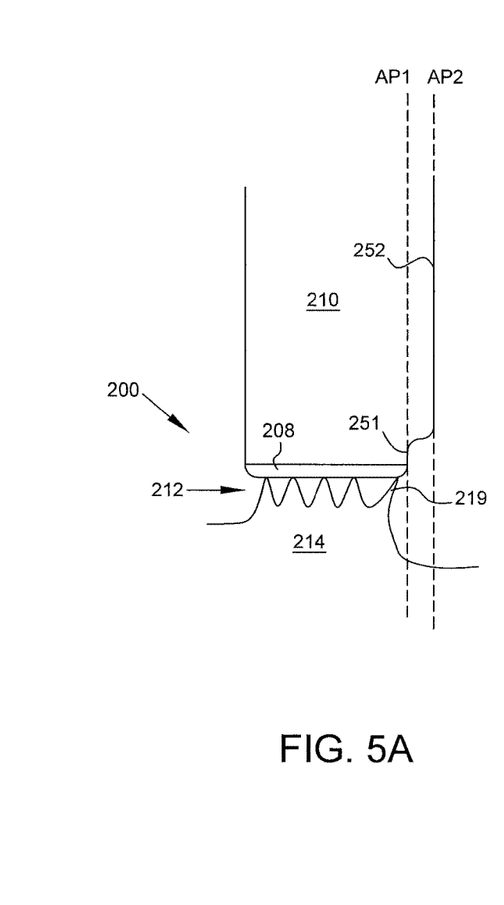
FIG. 5A a schematic and sectional view of a labyrinth-type seal assembly in a rotating machine in accordance with some embodiments of the present disclosure.
Figure 5B:
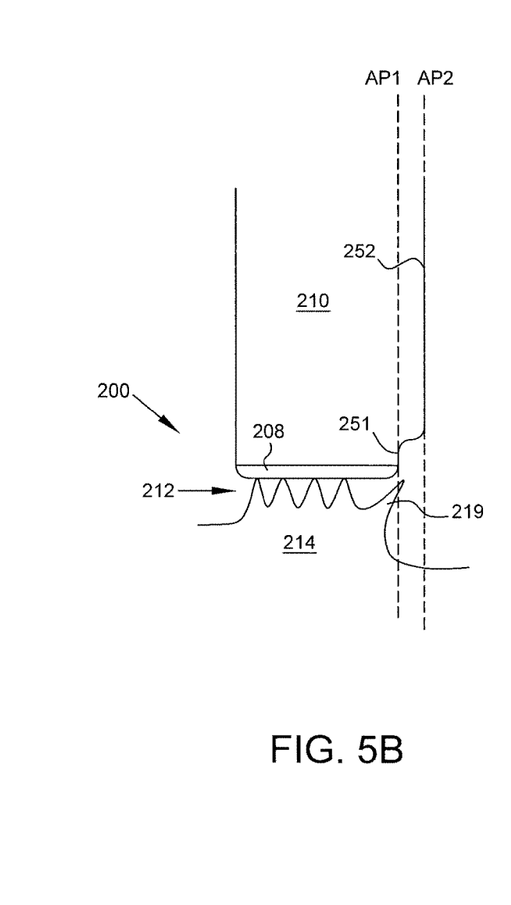
FIG. 5B a schematic and sectional view of a labyrinth-type seal assembly in a rotating machine in accordance with some embodiments of the present disclosure.

FIGS. 5A and 5B are schematic and sectional view of labyrinth-type seal assemblies in a rotating machine in accordance with some embodiments of the present disclosure. In some embodiments, outer seal member 210 may comprise a first radially extending surface 251 having a first axial position, represented by a dashed line labeled AP1, and a second radially extending surface 252 having a second axial position AP2, represented by a dashed line labeled AP2. In some embodiments, such as that illustrated in FIG. 5A, outer knife 219 is entirely disposed axially forward of first axial position AP1. In other embodiments, such as that illustrated in FIG. 5B, outer knife 219 extends axially aft past the first axial position AP1 but not past second axial position AP2. In still further embodiments, outer knife 219 extends axially aft past both the first axial position AP1 and the second axial position AP2.

The plurality of knives are typically milled from the respective shaft, but may also be separately formed and slid into position. Likewise in some embodiments an oil slinger may be additionally milled into the shaft.

The present disclosure provides many advantages over previous labyrinth-type seal assemblies. By providing an outer knife which extends axially and radially away from inner seal member, the disclosed seal assembly directs fluid flow away from the one or more seals formed by the abutment of terminal edges against the rub surface of the outer seal member. This structure additionally prevents pooling of fluid adjacent to the one or more seals. By directing fluid away and preventing pooling, the disclosed seal assembly demonstrates improved performance over previous labyrinth-type seal assemblies because it reduces, minimizes, and/or eliminates migration of fluid through the seal assembly. Improved performance of the disclosed seal assembly is particularly important when used in lubrication systems of rotating machines, since leakage of lubricant can lead to fires and catastrophic damage to the rotating machine. The disclosed seal assembly thus improves safety margins in rotating machines.

The present disclosure additionally provides advantages over alternative seal assemblies such as a carbon seal, lip seal, O-ring, or similar sealing mechanism, and an oil slinger placed in the vicinity of a labyrinth-type seal assembly to form a fluid or windage barrier. The disclosed seal assembly overcomes many of the limitations unique to each of these alternatives regarding operating temperatures, rotational speed, size and weight requirements, material compatibility, assembly constraints, and cost. In particular, the disclosed seal assembly has a minimal space requirement and does not require adding extra parts to achieve an effective seal, thus providing a simple design solution to ineffective labyrinth-type seal assemblies.

Although examples are illustrated and described herein, embodiments are nevertheless not limited to the details shown, since various modifications and structural changes may be made therein by those of ordinary skill within the scope and range of equivalents of the claims.

What is claimed is:
1. A shaft assembly comprising:
   a high speed shaft;
   a casing;
   a shaft bearing connecting the high speed shaft to the casing;
   a first seal axially displaced from the shaft bearing;
   a first chamber bounded in part by the first seal and the shaft bearing;
   the first seal comprising:
      a first knife having a first surface facing the shaft bearing and a second knife adjacent the first knife and axially disposed opposite the first surface;
      a rub strip disposed on an inner radial surface of the casing;
      wherein the first surface is oriented 15 to 45 degrees from the radial direction towards the shaft bearing, wherein an end of said first surface extends without contacting the rub strip, and the second knife having a radial end in contact with the rub strip; and
      wherein the first knife extends radially further than the second knife;
   a second seal assembly disposed on an opposite side of the shaft bearing from the first seal assembly;
   an oil slinger disposed on the shaft axially between the second seal assembly and the shaft bearing, the oil slinger extending radially from the shaft into a second chamber bounded in part by the second seal and the shaft bearing.
2. The shaft assembly of claim 1, wherein the first surface is axially off set from the rub strip towards the shaft bearing.
3. The shaft assembly of claim 1, wherein the first and second knives are milled from the shaft.
4. The shaft assembly of claim 1, wherein the shaft bearing receives lubricant spray from a fluid passageway defined by the casing.

\* \* \* \* \*